(12) United States Patent
Fitzgerald et al.

(10) Patent No.: US 6,568,636 B2
(45) Date of Patent: May 27, 2003

(54) BUFFER STOP ASSEMBLY

(75) Inventors: Adam Justin Fitzgerald, Vernon, CT (US); Todd Grenga, Enfield, CT (US)

(73) Assignee: Capewell Components Company Limited Partnership, South Windsor, CT (US)

( * ) Notice: Subject to any disclaimer, the term of this patent is extended or adjusted under 35 U.S.C. 154(b) by 0 days.

(21) Appl. No.: 09/778,640

(22) Filed: Feb. 7, 2001

(65) Prior Publication Data

US 2002/0104925 A1 Aug. 8, 2002

(51) Int. Cl.$^7$ ................................................. B64D 9/00
(52) U.S. Cl. ............... 244/118.1; 108/55.1; 248/366.02
(58) Field of Search ........................... 244/118.1, 137.1; 108/55.1, 901, 55.3, 55.5; 248/346.1, 346.02; 414/529; 410/146, 148, 77, 78, 79; 206/386

(56) References Cited

U.S. PATENT DOCUMENTS

| | | | | |
|---|---|---|---|---|
| 3,429,536 A | * | 2/1969 | Petry et al. | |
| 3,735,713 A | * | 5/1973 | Glassmeyer | |
| 4,077,590 A | * | 3/1978 | Shorey | |
| 4,629,379 A | * | 12/1986 | Harris et al. | |
| 4,824,050 A | * | 4/1989 | Courter | |
| 5,092,541 A | * | 3/1992 | Tofflemire et al. | |
| 5,439,152 A | * | 8/1995 | Campbell | |
| 5,644,992 A | * | 7/1997 | Clive-Smith | |
| 5,755,472 A | * | 5/1998 | Clive-Smith | |

* cited by examiner

Primary Examiner—Tien Dinh
(74) Attorney, Agent, or Firm—Alix, Yale & Ristas, LLP

(57) ABSTRACT

A buffer stop assembly for engagement within cargo aircraft to resist cargo movement. The buffer stop assembly comprises a horizontal member selectively engageable to the aircraft and a substantially vertical member resistant to movement by aircraft cargo. The members are mounted to each other. Preferably the panel mounting allows the vertical member to be moved between an extended position and a transport position overlying the horizontal member.

16 Claims, 5 Drawing Sheets

BUFFER STOP ASSEMBLY

BACKGROUND OF THE INVENTION

This invention relates generally to an aircraft cargo system. More particularly, the present invention relates to a buffer stop assembly for use in an aircraft cargo system.

The aerial delivery of supplies to a ground based area is well known. Often the container delivery system (CDS) is used to accomplish such aerial deliveries. The container delivery system comprises an aircraft configured to include an aerial delivery rail system that include floor having parallel forward to aft rails, parallel rows of forward to aft rollers and a center channel therebetween. The side rails, rollers and center channel extend from a door in the aft section of the aircraft toward the front. See, for example, Technical Outline T. O. 1C-130A-9, Section VIIC for more information.

The supplies are enclosed within a net or "container" that is attached to a folded parachute canopy. The container and canopy are attached to a base or skidboard. Each base with attached container and canopy is loaded into the aircraft and slid forward on the rollers. The first container moves forward to contact a forward stop. Each subsequent container moves forward to contact the preceding container. Each container is secured to the aircraft to prevent shifting during flight.

During use the aircraft flies to a desired drop off point. The aircraft aft section door is opened, each container restraint is loosened and the containers are moved rearward on the rails to gravity exit from the aircraft. Once outside the aircraft, the canopy deploys and the container descends to the ground.

A CDS container can weigh up to 2,328 pounds and some aircraft can hold a total of 16 containers for a maximum cargo load of 37,248 pounds. The forward stop must prevent this load from shifting forward during flight to prevent damage to the aircraft and injury to the flight crew. It should be noted that the forward stop must be capable of preventing forward movement of the entire container cargo even when the cargo is under an acceleration of three times the force of gravity.

Currently, the forward stop is constructed from two type IV aerial delivery pallets permanently configured in an L-shape. While the type IV forward stop was successful, its configuration was bulky and difficult to transport. In addition, type IV aerial delivery panels are no longer manufactured and have become very difficult to procure. Therefore, a forward stop utilizing such panels can not presently be manufactured.

SUMMARY OF THE INVENTION

The invention in a preferred form is a buffer stop assembly for use as a forward stop in an aircraft. The inventive buffer stop assembly can be used without requiring changes to aircraft presently configured for the container delivery system. The buffer stop assembly comprises a horizontal member preferably including a type V aerial delivery panel extrusion having a side rail, strut support, and end member mounted to each side and roller pads mounted to the lower surface. The side rails and roller pads are configured and positioned to interact with existing rails, rollers and center channel of the aircraft aerial delivery rail system.

A vertical member preferably including a second type V panel extrusion is arranged substantially vertically and perpendicularly to the horizontal panel. The vertical member comprises an end member and sidepiece mounted to each side of the panel. Each sidepiece is connected by a hinge block and a compression member to a respective horizontal member side rail. A plurality of inclined struts join the perpendicular panels into a rigid assembly. A center strap bisects each planar face of the vertical panel and extends beyond the vertical panel lower edge. The center strap extending portions are mounted to an L-shaped junction.

For transportation, the struts and bolts fixing a sidepiece to its respective hinge block can be removed to allow the vertical member to pivot around the compression member to a position overlying the horizontal member. Naturally, the folded position uses considerably less valuable aircraft cargo space than the extended position. When the buffer stop assembly is to be used as a forward stop, the vertical panel is extended around the pivot, each strut is reinstalled between the two panels and the side pieces are bolted to their respective hinge blocks. The extended buffer stop assembly is placed on the aircraft with the vertical panel facing aft, the horizontal member facing forward and with the roller pads positioned over the rollers. The buffer stop assembly is pushed forward to a desired position. In this position, existing aircraft rail system detents will lock into indents in each side rail. If further restraint is needed, a "H" block or the L-shaped junction can be bolted to the existing aircraft center channel. Alternatively, or in addition thereto, devises can be mounted to the buffer stop assembly and attached via tie-downs to aircraft mounted anchor points.

An object of the invention is to provide a buffer stop assembly using commercially available panel extrusions.

Another object of the invention is to provide a container delivery system forward restraint which can be folded for ease of transportation.

A further object of the invention is to provide a buffer stop assembly that can restrain a load of more than 30,000 pounds from forward movement during rapid deceleration.

A still further object of the invention is to provide a buffer stop assembly comprising commercially available aerial delivery panels which can be used in existing aircraft aerial delivery rail systems.

BRIEF DESCRIPTION OF THE DRAWINGS

Other objects and advantages of the invention will be evident to one of ordinary skill in the art from the following detailed description made with reference to the accompanying drawings, in which.

DETAILED DESCRIPTION OF THE INVENTION

Figure 1:
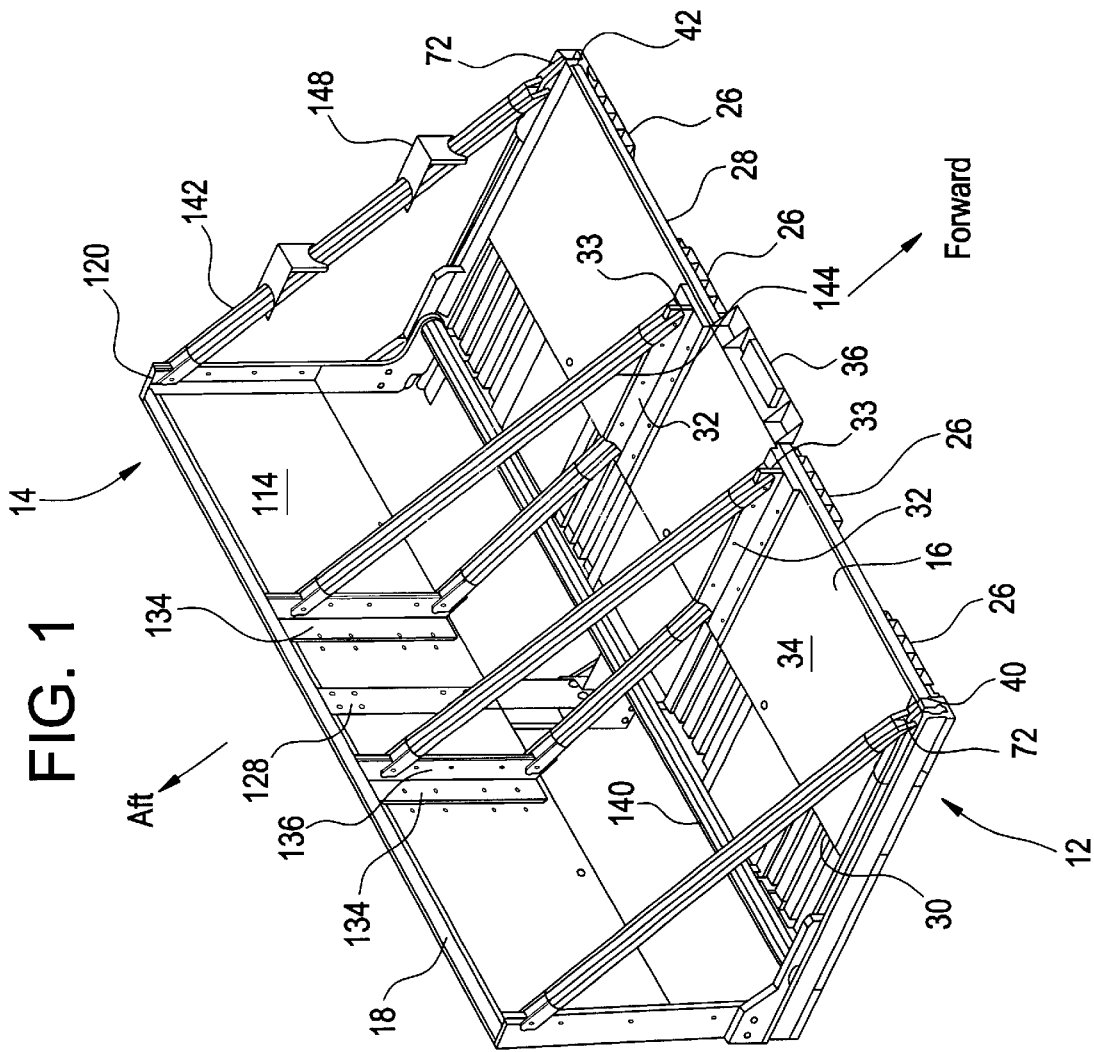
FIG. 1 is a perspective view from the forward end of an extended embodiment of an inventive buffer stop assembly.
Figure 4:
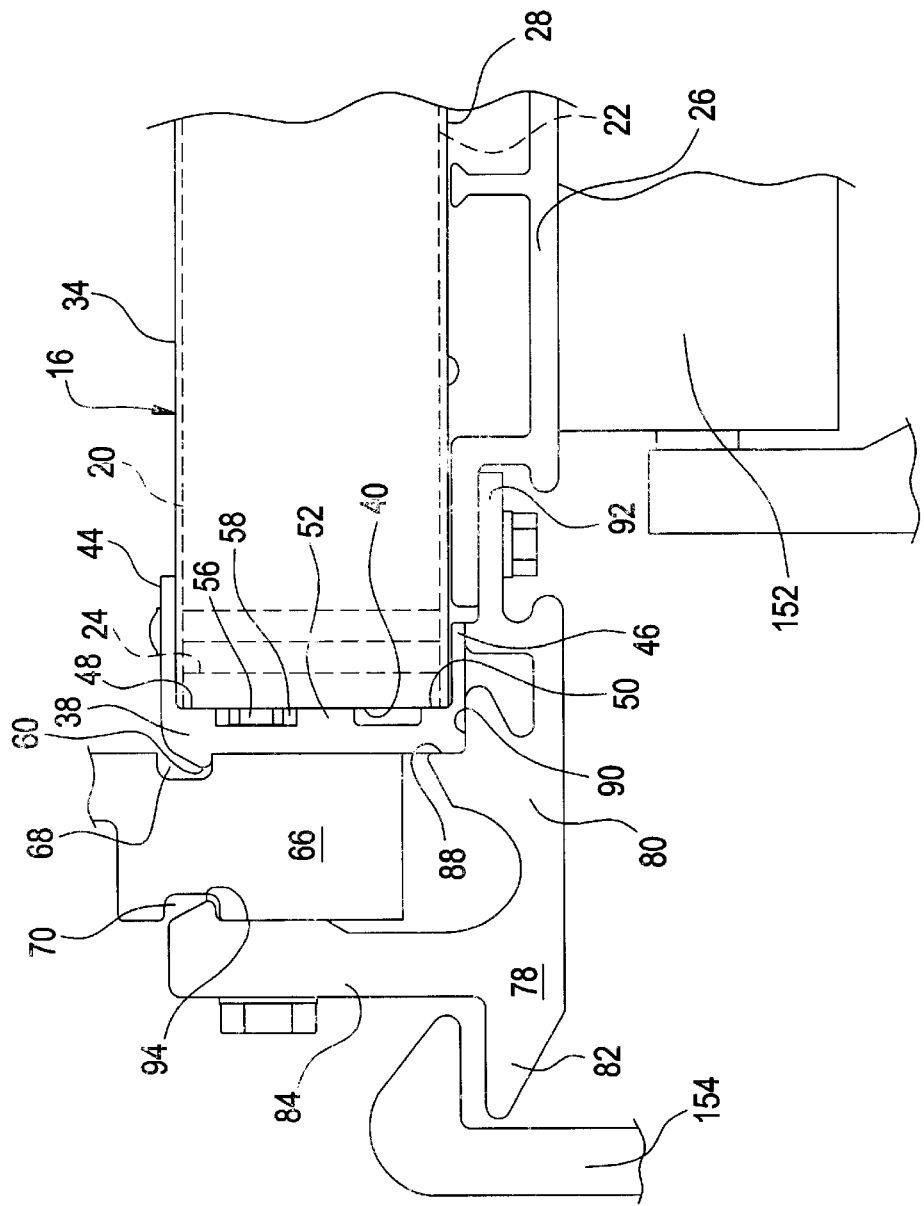
FIG. 4 is a front elevational view, partly in phantom, of a portion of an embodiment of the horizontal member of an inventive buffer stop assembly.

With reference to the drawings, wherein like numerals designate like components throughout the Figures, a buffer stop assembly is generally designated 10. As used herein, the directions forward and aft, shown in FIG. 1, refer to the positions of the buffer stop assembly 10 with respect to the front and rear respectively of the aircraft. As shown in FIG. 1, the buffer stop assembly 10 is comprised of a first horizontal member 12 and a second vertical member 14. Each member includes a panel 16, 18, respectively. With reference to FIG. 4 the panels 16, 18 (only panel 16 shown in FIG. 4) are preferably lightweight structures comprising spaced exterior sheets 20, 22 with a plurality of substantially hollow load support structures 24 therebetween. Type V aerial delivery pallet panel extrusions are known to be satisfactory for use as panels for the inventive buffer stop assembly. Type V panel extrusions are 24 inches long by 100 inches wide and are described in military specification MIL-P-44115B, dated Mar. 31, 1992, and drawings 11-1-2780, platform, Airdrop, Type V (available from U.S. Army Natick Research, Development, and Engineering Center, ATTN:

STRNC-UX, Natick, MA 01760-5017); the disclosures of which are incorporated by reference herein. Naturally, other panels could also be used.

Figure 2:
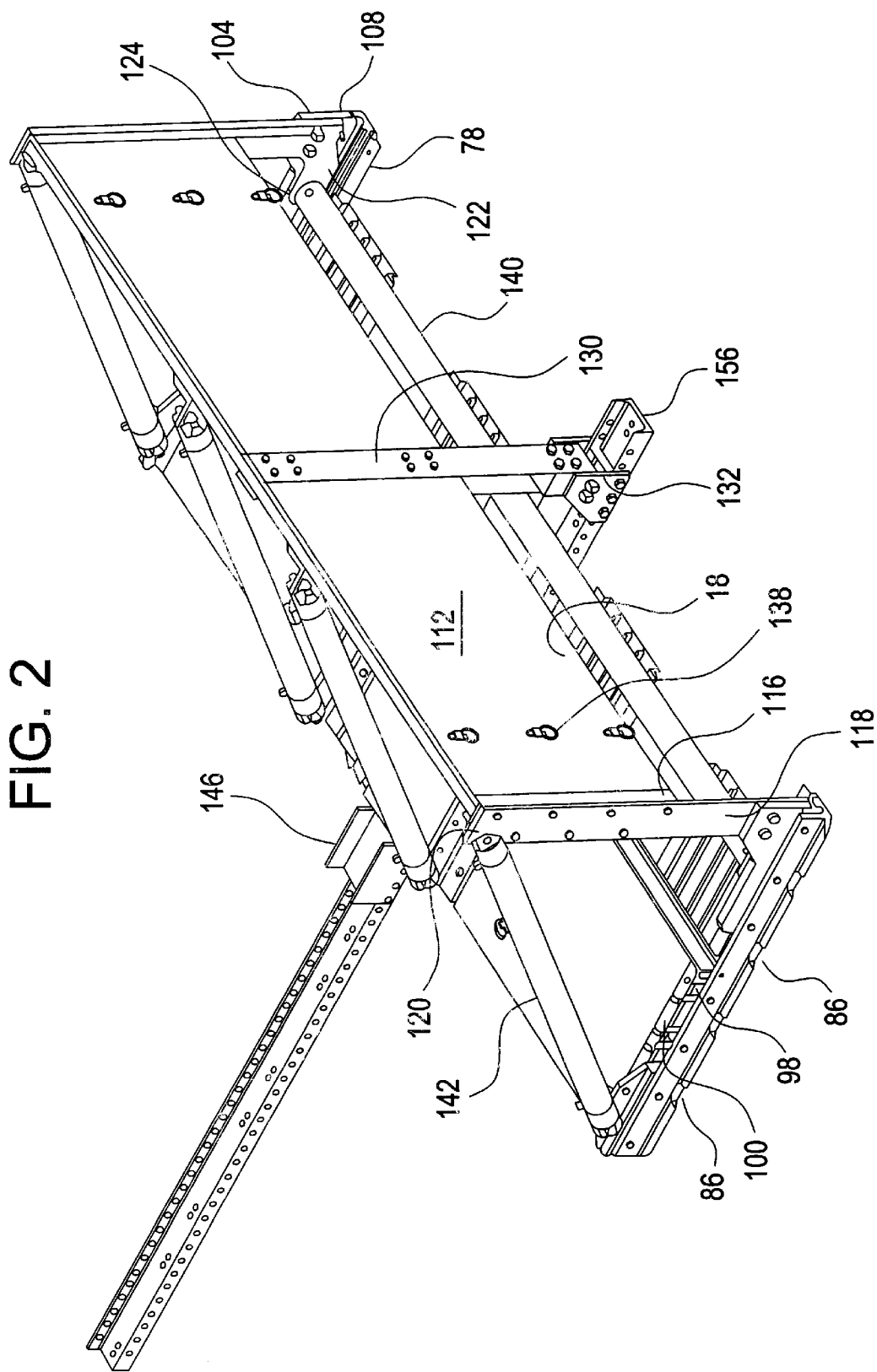
FIG. 2 is a perspective view from the aft end of an extended embodiment of an inventive buffer stop assembly.

With reference to FIGS. 1 and 2, the horizontal member 12 includes a plurality of roller pads, each 26. The roller pads 26 are mounted to a panel lower surface 28 and span the length of the panel 16. Preferably the roller pads 26 extend beyond the aft end 30 of the panel. A plurality of reinforcing gussets, each 32, are mounted to a panel upper surface 34 and substantially span the length thereof. The reinforcing gussets may be L-shaped structures placed in a back to back configuration and mounted to the panel. The gussets may include strut mounts 33. A stop block 36 is mounted to the first panel 16 at about the center of the forward edge.

As shown best in FIG. 4, an end member 38 is adjacent each side 40, 42 of the first panel 16. FIG. 4 illustrates only one side 40 of the horizontal member 12. It should be understood that while only a single side of the horizontal member is described, the opposing side will typically be a mirror image having substantially equivalent structure. The end member 38 preferably comprises an E-shaped cross-section with the upper and lower arms 44, 46 extending adjacent the horizontal panel upper 34 and lower 28 surfaces. The end member 38 typically extends along substantially the entire length of the horizontal panel side. The end member 38 is mounted to the panel 16 by, for example, rivets extending through the outermost arms 44, 46 into the panel 16. The end member 38 includes support pads 48, 50 adjacent the outermost arms that function in concert with a center arm 52 to space the end member 38 from the panel side 40. A plurality of fasteners 56 such as, for example, nuts are mounted along the length of the end member within an upper cavity 58 defined between the end member upper 44 and center 52 arms. The end member 38 preferably comprises an outwardly facing nose or flange 60. As used herein, inward and outward respectively refer to directions toward and away from a panel.

A strut support 66 is adjacent the outward side of the end member 38. The strut support 66 is preferably substantially rectangular with an axially extending recess 68, 70 defined in each side. When the strut support 66 is positioned adjacent the end member 38, the flange 60 is engaged within the inwardly facing recess 68. A strut mount 72 (broken off in FIG. 4 and shown best in FIGS. 1 and 2) extends upwardly from each strut support 66. Typically, the strut mount 72 is trapezoidally shaped. The strut support 66 is mounted toward the front of panel 16 and typically extends along only a portion of the panel side.

A side rail 78 is comprised of inwardly 80 and outwardly 82 facing flanges and a vertical mount 84 substantially perpendicular thereto. The outwardly facing flange 82 defines a plurality of indents 86 (shown best in FIG. 2). The inwardly facing flange 80 comprises vertical 88 and horizontal 90 support pads that engage the end member 38 and a horizontal mount 92 that engages the roller pad 26. The horizontal mount 92 is preferably mounted to the roller pad 26. Typically, a fastener is placed within aligned apertures (not shown) defined within the roller pad 26 and horizontal mount 92 and secured to a mating fastener (not shown) mounted within the horizontal panel. The vertical mount 84 preferably includes an inwardly facing nose or flange 94 that engages the outwardly facing recess 70 defined within the strut support 66.

A fastener is positioned within aligned apertures (not shown) defined within the vertical mount 84 and strut support 66 and secured to the nut 56 mounted within the end member upper cavity 58. The side rail 78 extends beyond the panel side width.

Since the strut support 66 does not typically extend the full length of the panel 16, a space is defined between the side rail 78 and end member 38 for part of the panel length as shown best in FIG. 2. A side rail bushing 98 may be positioned between the side rail 78 and end member 38. A fastener is positioned within aligned apertures (not shown) defined within the vertical mount 84, side rail bushing 98 and end member 38 and secured to a nut mounted within the end member upper cavity 58. A clevis 100 may be installed around the side rail bushing 98. The side rail bushing 98 and fastener function to additionally secure the side rail 78 to the panel 16 while also providing a tie down position for the buffer stop assembly 10 as later described.

Figure 3:
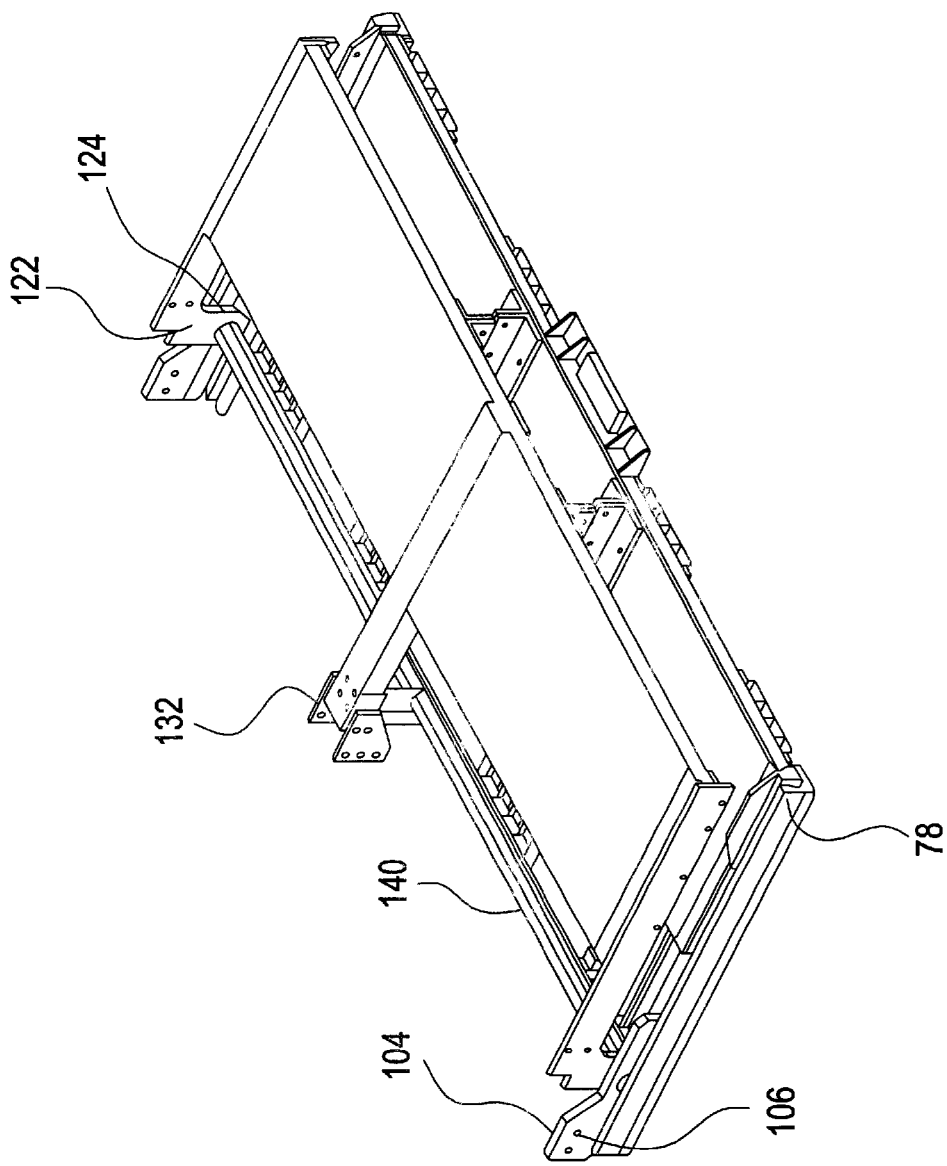
FIG. 3 is a perspective view of a folded embodiment of an inventive buffer stop assembly.

As shown best in FIGS. 2 and 3, a hinge block 104 is positioned toward the aft portion of the side rail 78. Each hinge block 104 comprises an inwardly facing indentation (not shown) and an aperture connecting the indentation to the hinge block outward face 106. The outward face 106 of the hinge block 104 defines a recess 108 that engages the inward-facing flange 94 of the vertical mount 84. The hinge block is mounted to the side rail with, for example, fasteners.

In the buffer stop assembly extended position shown in FIGS. 1 and 2, the vertical member 14 is preferably arranged substantially perpendicular to the horizontal member 12. The vertical member 14 comprises a panel 18 having an aft facing thrust face 112 and a forward facing reinforcing face 114.

In a manner similar to that described above, an end member 116 is mounted to each side of the vertical panel 18. A sidepiece 118 is mounted to each end member 116 and extends downward beyond the vertical panel 18 lower edge. Each sidepiece 118 includes a strut mount 120 toward the upper end and an L-shaped lower portion 122 with a forward facing lower leg 124. Each lower leg comprises an aperture (not shown) connecting an inward face to an outward face. A forward center strap 128 is mounted to the reinforcing face 114 of the vertical panel 18 and extends from the panel upper edge to beyond the panel lower edge. An aft center strap 130, shown best in FIG. 2, is spaced rearward from the forward center strap 128, is mounted to the vertical panel thrust face 112 and extends from the panel upper edge to beyond the lower edge. The front and aft center straps 128, 130 are mounted at their respective lower portions to a junction block 132. Preferably, the forward and aft center straps are mounted at approximately the center of the vertical member 14. A plurality of reinforcing gussets, each 134, is mounted to the vertical panel reinforcing face 114. The reinforcing gussets 134 may be L-shaped structures placed in a back to back configuration. The gussets 134 may include strut mounts 136. A plurality of deck rings 138 are mounted to the vertical panel thrust face 112. The deck rings 138 function to provide another tie down position for the buffer stop assembly 10.

Each sidepiece 118 lower portion is adjacent the inward face of a respective hinge block 104. A compression member 140 is located within the indentations of opposing side rails and extends through the apertures of opposing sidepieces. The compression member 140 includes opposing ends defining apertures. A fastener is mounted through the indentation aperture in a hinge block 104 and secured in the respective compression member 140 end aperture. The compression member 140 functions as a transverse-reinforcing member for the buffer stop assembly. The vertical member 14 pivots around the compression member 140. While the preferred embodiment for an inventive buffer stop assembly provides pivoting of the vertical member 14 with relation to the horizontal member 12, it should be understood that other embodiments of the invention are contemplated wherein the vertical and horizontal members are permanently assembled such as by welding so that the members do not pivot.

With reference to FIGS. 1 and 2, a reinforcing strut 142 is mounted between the sidepiece strut mount 120 and side rail strut mount 72 at each side of the buffer stop assembly. Additional reinforcing struts 144 are mounted between corresponding reinforcing gusset strut mounts 33, 136 on the horizontal 16 and vertical 18 panels. Preferably, the buffer stop assembly comprises struts mounted to strut mounts between the upper edge of the vertical panel and forward edge of the horizontal panel as well as between the lower edge of the vertical panel and aft edge of the horizontal panel. While the struts 142, 144 may be mounted to the buffer stop assembly in a number of ways, use of bolts with self-locking nuts to fasten the strut to the strut mount has been found effective. Steps 148 may be mounted to a strut to help the aircrew move over the buffer stop assembly.

Figure 5:
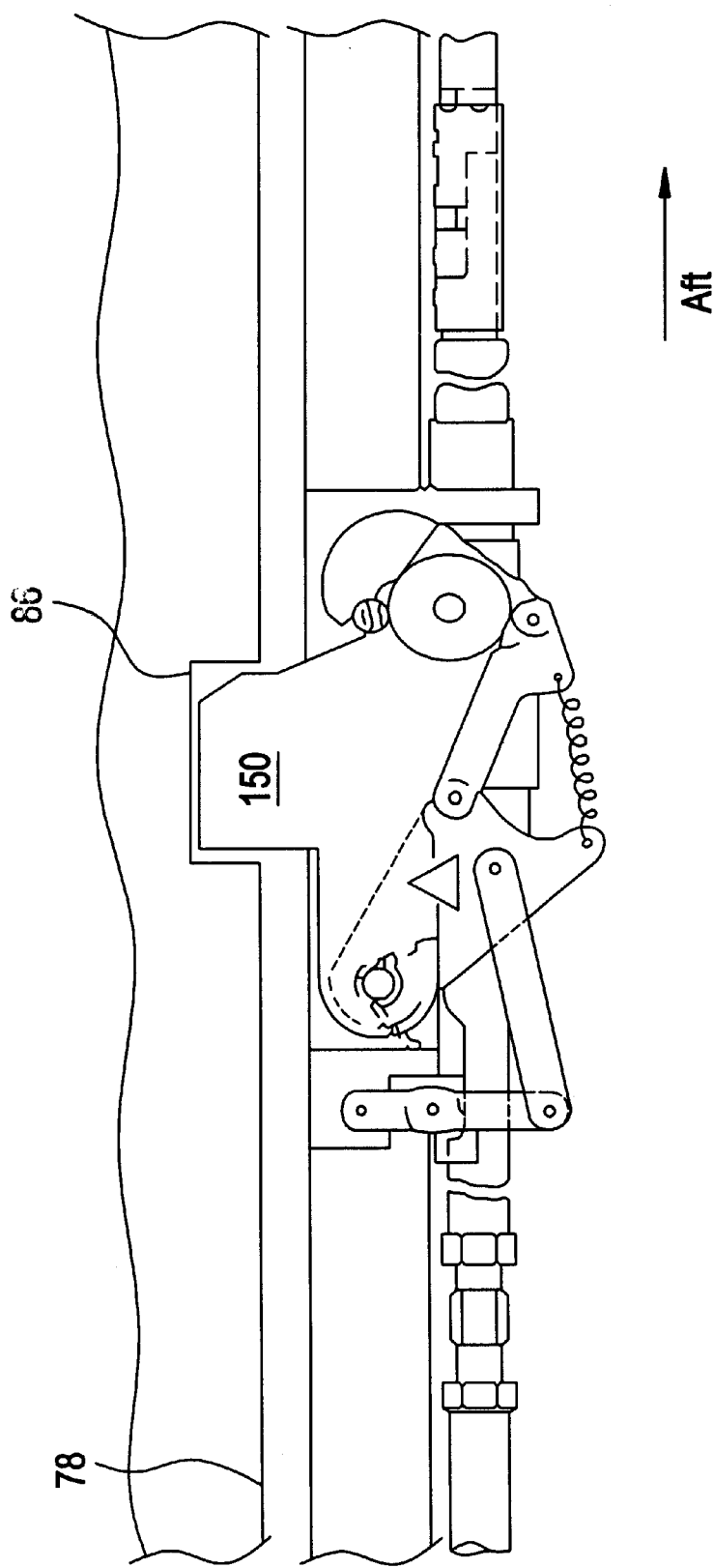
FIG. 5 is a top plan view of a portion of an embodiment of the horizontal member of an inventive buffer stop assembly with an aircraft mounted detent engaged therein.

In operation, the extended buffer stop assembly is loaded onto an aircraft having an aerial delivery rail system. The buffer stop assembly is positioned with the vertical panel reinforcing face 114 toward the aircraft front section and the thrust face 112 toward the aircraft aft section. The roller pads 26 are located over rollers 152 mounted within the aircraft floor, each side rail outward flange 82 is positioned below an aircraft mounted rail 154 and the junction block 132 is positioned adjacent an aircraft mounted center channel 156. The buffer stop assembly is pushed toward the front of the aircraft to a desired position. In this position, detents 150 mounted to the aircraft on each side of the buffer stop assembly will engage within indents 86 defined within the respective side rail 78. See FIG. 5. The engagement of detents 150 within side rail indents 86 and side rail 78 engagement with aircraft rails 154 is sufficient to allow the buffer stop assembly to resist a working force of up to 15,000 pounds applied to the thrust face in a forward direction. It should be understood that the system is designed to withstand the above working force under a forward acceleration of three times gravity. If resistance to working forces greater than 15,000 pounds is desired, additional restraint is preferably provided. The additional restraint may be provided as shown in FIG. 2 by mounting the junction block 132 and H block 146 to the aircraft center channel 156 using, for instance, fasteners. Alternatively, restraints such as tie downs or chains are mounted between the devises 100 as mounted to respective side rail bushings 98 and deck rings 138 and aircraft anchor points (not shown). The additional restraints function to resist a working force of 37,248 pounds. The additional restraints are designed to withstand the above working force a forward acceleration of three times gravity. Naturally, both types of restraints could be used simultaneously. It should be understood that the aircraft mounted rails 154, rollers 152, center channel 156, H block 146 and anchor points do not form part of the invention but are recited to help illustrate the best manner of making and using the invention.

To fold the buffer stop assembly for transport, the self-locking nuts and bolts are removed from the struts and strut mounts. The struts are removed from the strut mounts and placed in a storage bag along with the bolts. The nuts and bolts are removed from the hinge blocks and the bolts placed in the storage bag. The vertical member 14 may be pivoted around the compression member longitudinal axis and moved substantially parallel with the horizontal member 12. To extend the buffer stop assembly the steps are reversed. Generally, a new set of self-locking nuts will be used each time the buffer stop assembly is extended to minimize the danger of the nuts working loose from vibration during transport and possible failure of the assembly.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. A buffer stop assembly for use in an aircraft comprising:
    a horizontal base with an upper surface, a lower surface and a first side spaced from a second side;
    a first side rail spaced from the first side and mounted to the base;
    a thrust face; and
    a strut connecting the horizontal base to the thrust face, and the strut comprises a step substantially parallel to the upper surface of the base.

2. A buffer stop assembly for use in an aircraft comprising:
    a horizontal base with an upper surface, a lower surface and a first side spaced from a second side;
    a first side rail spaced from the first side and mounted to the base;
    a thrust face;
    means for connecting the horizontal base to the thrust face,
    a vertical member having spaced first and second sides and including the thrust face and a reinforcing face spaced from the thrust face;
    a second side rail mounted adjacent the second side of the horizontal base;
    a first side piece mounted adjacent the vertical member first side and a second side piece mounted adjacent the vertical member second side; and
    a hinge block positioned between one said side rail and a respective said sidepiece and mounted to the side rail.

3. The buffer stop assembly of claim 2 wherein the horizontal base and vertical member are spatially separated and comprising connector means for additionally connecting the horizontal base to the vertical member.

4. A buffer stop assembly for use in an aircraft comprising:

a horizontal base with an upper surface, a lower surface and a first side spaced from a second side;

a first side rail spaced from the first side and mounted to the base, wherein the side rail comprises angularly offset mounting points;

a thrust face; and means for connecting the horizontal base to the thrust face.

5. The buffer stop assembly of claim 4 adapted to engage with an aerial delivery rail system.

6. The buffer stop assembly of claim 4 comprising a roller pad substantially parallel with the base first edge.

7. The buffer stop assembly of claim 4 comprising a vertical member including the thrust face and a reinforcing face spaced from the thrust face, the reinforcing face having a first gusset mounted thereto;

a second gusset mounted to the horizontal base; and the means for connecting comprises a strut connecting the first gusset to the second gusset.

8. The buffer stop assembly of claim 4 comprising hinge means for additionally connecting the horizontal base to the thrust face so that the buffer stop assembly has an extended position with the horizontal base substantially orthogonal with respect to the thrust face and a folded position with the horizontal base substantially parallel to the thrust face.

9. The buffer stop assembly of claim 4 comprising an end member mounted adjacent the first side of the horizontal base and a strut support mounted between the side rail and the end member.

10. The buffer stop assembly of claim 4 wherein the side rail is mounted to the base lower surface.

11. The buffer stop assembly of claim 4 including means for mounting the side rail to the horizontal base, the means for mounting comprising substantially perpendicular mounting points.

12. The buffer stop assembly of claim 4, wherein the horizontal base is about 100 inches wide from the first side to the second side.

13. The buffer stop assembly of claim 4 comprising a second side rail adjacent the second side of the horizontal base, the first side rail having a flange with a first outward edge and the second side rail having a flange with a second outward edge, wherein the distance between the first and second outward edges is 108 inches.

14. A buffer stop assembly for use in an aircraft comprising:

a horizontal base with an upper surface, a lower surface and a first side spaced from a second side;

a first side rail spaced from the first side and mounted to the base;

a thrust face; and means for connecting the horizontal base to the thrust face;

a vertical member having spaced first and second sides and including the thrust face and a reinforcing face spaced from the thrust face;

a second side rail mounted adjacent the second side of the horizontal base;

a first side piece mounted adjacent the vertical member first side and a second side piece mounted adjacent the vertical member second side, each side piece having an L shaped extension;

a block positioned between each said side rail and respective side piece L shaped extension and mounted to the side rail; and a compression member mounted between the each side rail; and a center strap mounted to one of the vertical panel faces.

15. A buffer stop assembly for use in an aircraft comprising:

a horizontal base with an upper surface, a lower surface and a first side spaced from a second side;

a first side rail spaced from the first side and mounted to the base, wherein the side rail comprises a first mounting point substantially parallel to the base lower surface and a second mounting point substantially perpendicular to the base lower surface;

a thrust face; and means for connecting the horizontal base to the thrust face.

16. A buffer stop assembly for use in an aircraft comprising:

a horizontal base with an upper surface, a lower surface and a first side spaced from a second side;

a first side rail spaced from the first side and mounted to the base;

a thrust face; and means for connecting the horizontal base to the thrust face, a horizontal member including the horizontal base, a first end member mounted to the base first side and a second end member mounted to the base second side, the first side rail mounted to the base lower surface and to the first end member, a second side rail spaced from the second side and mounted to the base lower surface and to the second end member, a first strut support mounted between the first side rail and the first end member, the first side rail having a first portion extending beyond the horizontal base and the second side rail having a second portion extending beyond the horizontal base;

a vertical member having spaced first and second sides and including the thrust face, a first end member mounted adjacent the first side and a second end member mounted adjacent the second side, a first side piece mounted to the first end member and a second side piece mounted to the second end member, the first side piece having a first portion extending beyond the vertical member and the second side piece having a second portion extending beyond the vertical member; and a strut mounted between the first side piece and the first strut support;

wherein the means for connecting comprises a strut mounted between the first side piece and the first strut support, and means for selectively mounting each side rail extending portion to a respective side piece extending portion.

* * * * *